US008567036B2

(12) United States Patent
Pei

(10) Patent No.: US 8,567,036 B2
(45) Date of Patent: Oct. 29, 2013

(54) METHOD FOR ASSEMBLING LENS MODULE

(75) Inventor: Shao-Kai Pei, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 85 days.

(21) Appl. No.: 13/329,223

(22) Filed: Dec. 17, 2011

(65) Prior Publication Data

US 2013/0067720 A1 Mar. 21, 2013

(30) Foreign Application Priority Data

Sep. 16, 2011 (TW) .................................. 100133536

(51) Int. Cl.
*B22D 11/124* (2006.01)
*B23P 17/00* (2006.01)
*G02B 27/10* (2006.01)
*G02B 7/02* (2006.01)
*G03B 7/00* (2006.01)

(52) U.S. Cl.
USPC .......... 29/527.1; 156/154; 359/619; 359/811; 359/819; 359/808; 396/529; 396/530

(58) Field of Classification Search
USPC ........ 29/527.1, 527.2, 411, 412; 156/74, 281, 156/275.7, 273.3, 273.5, 256
See application file for complete search history.

(56) References Cited

U.S. PATENT DOCUMENTS

| 7,059,040 B1* | 6/2006 | Webster et al. .................. 29/831 |
| 7,639,435 B2* | 12/2009 | Chiang .......................... 359/819 |
| 7,709,776 B2* | 5/2010 | Farnworth et al. .......... 250/208.1 |
| 7,943,002 B2* | 5/2011 | Lu .................................. 156/297 |
| 8,013,289 B2* | 9/2011 | Chang et al. .................. 250/239 |
| 2007/0296847 A1* | 12/2007 | Chang et al. .................. 348/340 |
| 2008/0158698 A1* | 7/2008 | Chang et al. .................. 359/819 |
| 2013/0003199 A1* | 1/2013 | Jeong et al. .................... 359/819 |

* cited by examiner

*Primary Examiner* — David Bryant
*Assistant Examiner* — Jun Yoo
(74) *Attorney, Agent, or Firm* — Altis & Wispro Law Group, Inc.

(57) ABSTRACT

A method for assembling a lens module is provided. The lens module includes a lens barrel, a lens holder, a lens and a filter. The lens barrel includes a first portion and a second portion. The method for assembling the lens module includes the steps of; providing a tray which defines a plurality of perforations, each of which is for accommodating the lens barrel; spreading glue on the second portion, and affixing the filter on the second portion by means of glue; solidifying the glue; cleaning the inside of the lens barrel after the filter is mounted on the second portion; cutting the filter into a plurality of filter portions whose shape matches the shape of the second portion; and placing the lens holder with the lens into the lens barrel complete with a filter portion after the lens barrel has been cleaned.

7 Claims, 5 Drawing Sheets

METHOD FOR ASSEMBLING LENS MODULE

BACKGROUND

1. Technical Field

The present disclosure relates to assembly methods and, particularly, to a method for assembling a lens module.

2. Description of Related Art

Many lens modules include a lens holder, a lens mounted within the lens holder, a lens barrel for receiving the lens holder, and a filter. The filter is affixed to the lens barrel with adhesive. A method for affixing the filter to the lens barrel includes the steps of spreading glue on a surface of the lens barrel and affixing the filter on the lens barrel by means of the glue. During the affixing procedure, if the amount of glue spread is too little, the filter will disengage from the lens barrel, but if the amount is too much, the excess glue will contaminate or stain the lens holder and the lens.

Therefore, what is needed is a method for assembling a lens module to overcome the described limitations.

DETAILED DESCRIPTION

Figure 1:
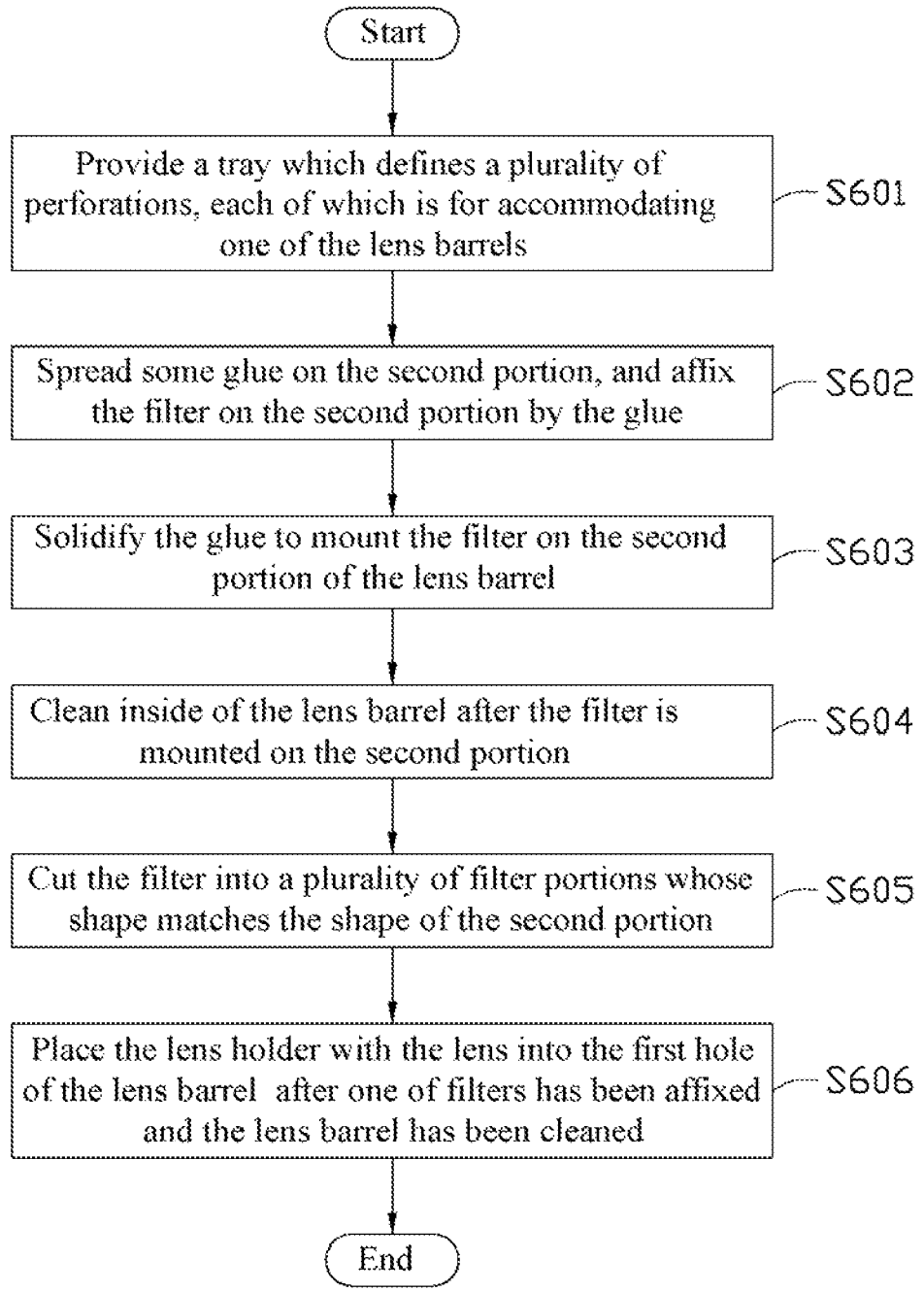
FIG. 1 is a flowchart of a method for assembling a lens module in accordance with an exemplary embodiment.
Figure 2:
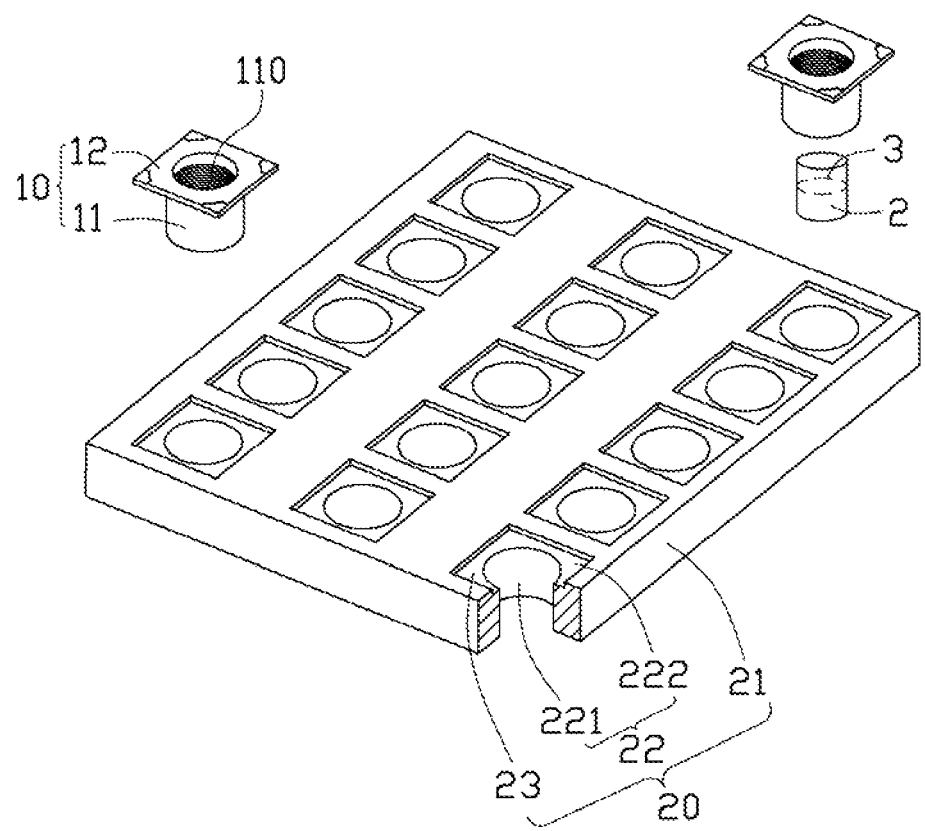
FIGS. 2-5 are schematic illustrations showing the assembly of the lens module implemented by the assembling method of FIG. 1.
Figure 3:
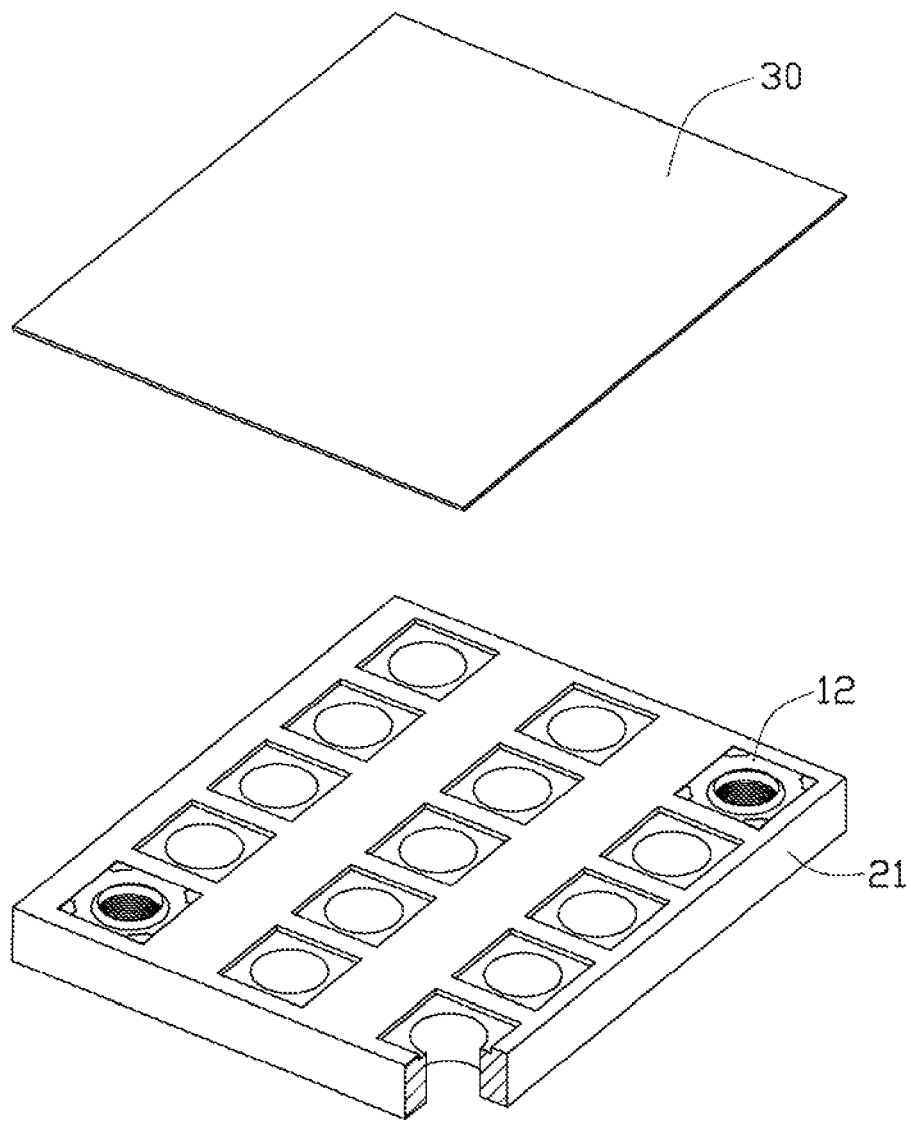
Figure 4:
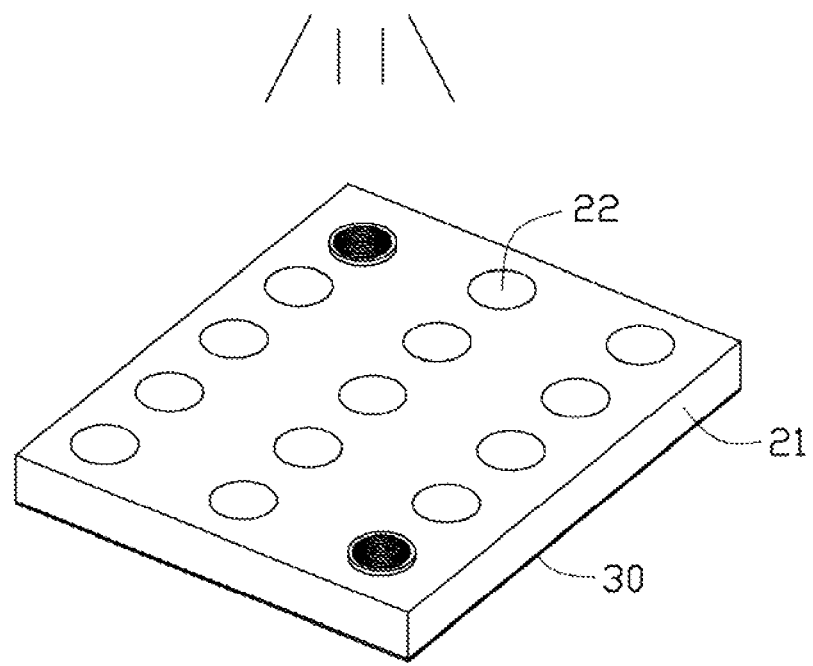
Figure 5:
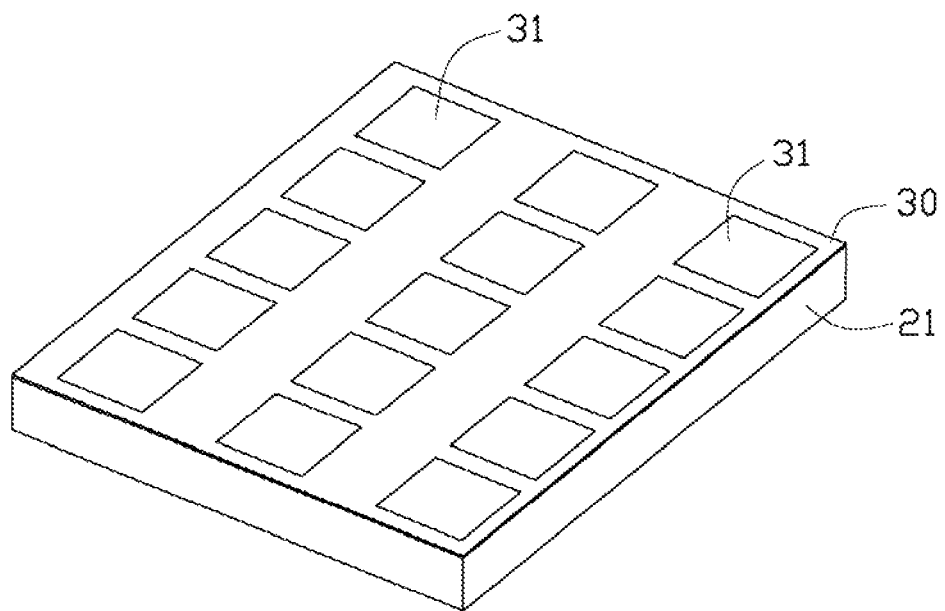

FIG. 1 is a flowchart of a method for assembling a lens module. Referring to FIGS. 2-5, the lens module includes a lens holder 2, a lens 3 mounted within the lens holder 2, a lens barrel 10 for receiving the lens holder 2, and a filter 30. The lens barrel 10 includes a first portion 11 and a second portion 12 coaxial with each other. The first portion 11 and the second portion 12 each define a first hole 110 passing through both portions. An inner diameter of the first portion 11 is equal to that of the second portion 12, and an outer diameter of the first portion 11 is less than that of the second portion 12, thereby forming a stepped portion between the first portion 11 and the second portion 12. An inner diameter of the first hole 110 is equals to an outer diameter of the lens holder 2, thereby making the lens holder 2 to be easily placed in the lens barrel 10. In one embodiment, the second portion 12 is square. In another embodiment, the second portion 12 may be another shape. The lens module can be assembled by performing the following steps.

Referring to FIG. 2 again, in step S601, a tray 20 which defines a number of perforations 22 is provided. Each of the perforations 22 accommodates one of the lens barrels 10. The tray 20 is cuboid, and includes a main body 21. The perforations 22 are defined on the main body 21. Each perforation 22 includes a first perforation 221 and a second perforation 222 coaxial with each other. The first perforation 221 is circular and matches the shape of the first portion 11, and the second perforation 222 is square and matches the shape of the second portion 12. A touch surface 23 is formed in an intersection between the first perforation 221 and the second perforation 222. When the first portion 11 is located in the first perforation 221, the stepped portion rests on the touch surface 23, and the second portion 12 is located in the second perforation 222.

Referring to FIG. 3 again, in step S602, some glue is spread on the second portion 12, and the filter 30 is affixed on the second portion 12 by the glue. In one embodiment, the glue is spread on the second portion 12 by a spin coating process.

Referring to FIG. 3 again, in step S603, the glue is solidified by a UV (ultraviolet) light source, thereby mounting the filter 30 on the second portion 12 of the lens barrel 10. In one embodiment, the filter 30 is made of glass.

Referring to FIG. 4 again, in step S604, an inside of the lens barrel 10 is cleaned by washing the first hole 110 of the first portion 11 of the lens barrel 10 with water, thereby cleaning the remaining glue from the inside of the lens barrel 10.

Referring to FIG. 5 again, in step S605, the filter 30 is cut into a number of filter portions 31 whose shape matches the shape of the second portion 12. In one embodiment, the filter 30 is cut by a laser process.

Referring to FIG. 2 again, in step S606, the lens holder 2 with the lens 3 is placed into the first hole 110 of the lens barrel 10 after one of the filter portions 31 has been affixed after the lens barrel 10 has been cleaned, thereby finishing the procedure of assembling the lens module.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. A method for assembling a lens module which comprises a lens barrel, a lens holder, a lens mounted within the lens holder, and a filter, wherein the lens barrel comprises a first portion and a second portion coaxial with each other, the first portion and the second portion each define a first hole passing through both portions; the method comprising:

providing a tray which defines a plurality of perforations, each of which is for accommodating the lens barrel;

inserting the lens barrel into one of the plurality of perforations in the tray;

spreading some glue on the second portion, and affixing filter on the second portion by the glue;

solidifying the glue to mount the filter on the second portion of the lens barrel;

cleaning inside of the lens barrel after the filter is mounted on the second portion;

cutting the filter mounted on the second portion of the lens barrel into a shape which matches the shape of the second portion of the lens barrel; and placing the lens holder with the lens into the first hole of the lens barrel after cutting the filter mounted on the second portion of the lens barrel and cleaning the lens barrel.

2. The method as described in claim 1, wherein the glue is solidified by a UV (ultraviolet) light source.

3. The method as described in claim 1, wherein each perforation comprises a first perforation and a second perforation coaxial with the first perforation, the first perforation is circular and matches the shape of the first portion, the second perforation is square and matches the shape of the second portion, the first portion is located in the first perforation, and the second portion is located in the second perforation.

4. The method as described in claim 1, wherein the glue is spread on the second portion by a spin coating process.

5. The method as described in claim 1, wherein the step for cleaning the inside of the lens barrel comprises:

washing the first hole of the first portion of the lens barrel with water, thereby cleaning the remaining glue from inside of the lens barrel.

6. The method as described in claim 1, wherein an inner diameter of the first portion is equal to that of the second portion, and an outer diameter of the first portion is less than that of the second portion.

7. The method as described in claim 1, wherein an inner diameter of the first hole is equals to an outer diameter of the lens holder.

* * * * *